United States Patent Office 3,409,984
Patented Nov. 12, 1968

3,409,984
SHAVING HEAD FOR DRY SHAVERS HAVING
A COATED OUTER SURFACE
Bodo Fütterer, Sarnen, Switzerland, assignor to The
 Gillette Company, Boston, Mass., a corporation of
 Delaware
Filed Dec. 17, 1965, Ser. No. 524,661
6 Claims. (Cl. 30—346.51)

ABSTRACT OF THE DISCLOSURE

A shearing foil having a substrate body with perforations conforming to the tooth formation of a cooperating blade, and a relatively thin coating of a material harder than said substrate body on the outer surface of the body and extending along the periphery of the perforations to the inner surface of the body while leaving the inner surface devoid of a coating and completely exposed to thereby form hard cutting edges along the rims of the perforations at their inner surface.

My present invention relates to shearing foils, i.e. to contoured and/or apertured protective foils as used in co-operation with one or more underlying blades whose teeth are separated by spaces registering with the perforations of the foil.

Shearing foils are employed in many types of dry shavers. The thinner such foils can be made, the closer are the shaves they afford.

In the production of thin, hard foils, capable of assuming an unlimited variety of hole patterns, galvano-plastic manufacturing processes have come increasingly into use in lieu of prior methods employing stamped and hardened sheet steel. However, a galvanically produced deposit inherently combines a high degree of hardness with marked brittleness and consequently its hardness has to be reduced in order to minimize any risk of fracture. Moreover, conventionally electroformed shearing foils do not retain their sharp edges as long as do steel foils.

Accordingly, it is an important object of this invention to provide an improved shearing foil combining a high degree of hardness along its cutting edges with good elasticity, so as to be substantially fracture-proof, as well as a relatively simple process for making such foils.

Another object of my invention is to provide a shearing foil of this description whose edges are practically self-sharpening.

These objects are realized, in accordance with my invention, by providing on one surface of a supporting metal foil, having a chosen array of gaps or perforations, a coating of greater hardness which extends into the perforations and covers the peripheral walls thereof. The other surface of the foil, i.e. the one which is to contact the blade upon assembly in a shaver, is not coated with the hard material. Such shearing foils exhibit abrasion-resistant cutting edges along the rims of the perforations where the hard coating meets the exposed surface of the softer substrate. In use, this substrate is eroded faster than the coating so as to form an acute rake angle along each cutting edge. As a further result of this erosion, the friction between the shearing foil and the cutter blade is greatly reduced. Consequently, upon continued use there will occur but little further wear on the foil surface contacting the blade, with consequent preservation of the shape of the hard cutting edges.

According to another aspect of my invention, a shearing foil of the character described is produced by depositing a relatively soft layer of metal on a conductive matrix having a chosen array of perforation-defining portions masked with an insulating substance to prevent a deposition of the metal thereon. A coating of a relatively hard material is then applied to the exposed surface of the electroformed layer, either electrolytically or by some other method of deposition, so as to extend to the very botto mof the peripheral walls of the perforations which are formed in the supporting layer at the locations of the nonoconductive zones.

For a better understanding of the invention, reference is had to the following description taken in conjunction with the accompanying drawing in which.

Figure 1:
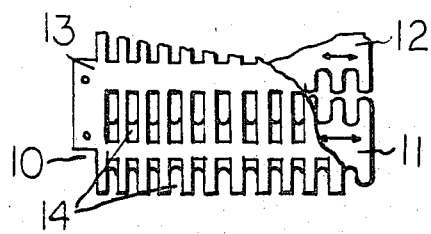
FIG. 1 is a plan view of part of a shaving-head assembly including a shearing foil embodying the invention.

FIG. 1 shows part of a shaving head 10, as used in conventional electric shavers, wherein a set of laterally oscillatable blades 11, 12 are overlain by a protective foil 13 whose slot-like perforations 14 register with the interteeth gaps 15 of the blades.

Figure 2:
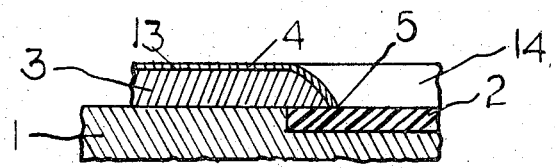
FIG. 2 is a cross-sectional view of an arrangement for making the shearing foil of FIG. 1.

In FIG. 2 there is shown a conductive matrix or die 1 with surface recesses occupied by an insulating layer 2, the distribution of insulation 2 corresponding to the pattern of perforations 14 in FIG. 1. Upon die 1 there is galvanically deposited a layer 3 of a metal, preferably nickel, which for reasons of elasticity should have a relatively low hardness of, say, 400° Vickers. Because of the three-dimensional growth of the galvanic deposit, the voids formed therein are somewhat narrower than the corresponding recesses in matrix 1 so that the electroformed body 3 extends partly, with a convex curvature, over insulating layer 2. A thin, hard coating 4 is then deposited on layer 3 to define a sharp edge 5 at the bottom of each perforation 14. Layers 3 and 4, differing in hardness, may be both cathodically formed either from the same or from different metals. Where both layers are made from the same metal, the harder layer 4 may be produced by varying the conditions of electrodeposition, e.g. by increasing the current density.

Thus, covering layer 4 may consist of a metal such as chromium, rhodium, or hard nickel. This coating may also be produced from non-metallic materials such as ceramic or vitreous substances, and particularly in this instance may be deposited on substrate 3, in the form of a hardenable fluid layer, by brushing, spraying or similar techniques.

Figure 3:
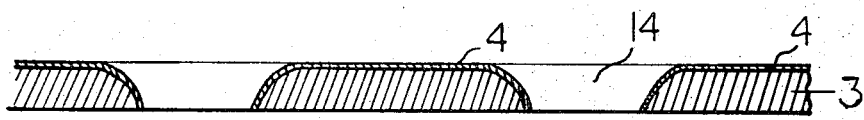
FIG. 3 is a cross-sectional view of a portion of the freshly made shearing foil.

FIG. 3 shows the finished foil 13 immediately after it has been removed from the die, illustrating its internally coated perforations 14 which converge toward the uncoated underside of substrate 3.

Figure 4:
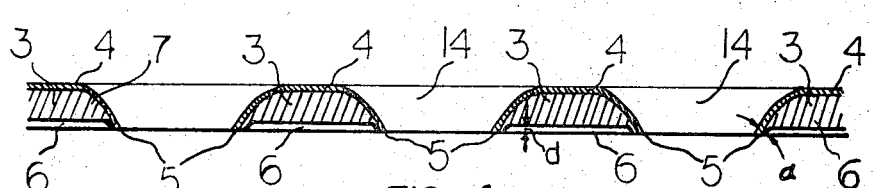
FIG. 4 is a view similar to FIG. 3, showing the foil after an initial period of use.

FIG. 4, in a similar cross-sectional view, shows the partial erosion of the exposed underside of the shearing foil by the co-operating blade or blades during its initial use. Thus, the undersurface of the substrate 3 wears to a greater degree than its cutting edges 5, formed by the harder coating 4, so that concavities 6 come into existence along this surface. The depth of these concavities has been indicated at $d$. As a consequence of this phenomenon, the friction between the shearing foil and the cutter blade is reduced whereby the foil becomes less subject to stresses; at the same time its hard cutting edges 5 are effectively sharpened to exhibit an acute angle $\alpha$. The hard coating is also subject to relatively little strain, e.g. upon a flexing of the foil, by virtue of the rounding of the outer edges 7 of the perforations 14 which converge toward the cutting edges 5.

While there has been described what is, at present, considered to be a preferred embodiment, it will be obvious to those skilled in the art that various modifications may be made therein without departing from the spirit and scope of my invention as defined in the appended claims.

I claim:
1. A shearing foil for a dry shaver having a movable cutter blade, said foil comprising a substrate body having perforations conforming to tooth formation of said movable blade, said body having an inner surface for contacting the movable blade and an outer surface, and a relatively thin coating of a material harder than said substrate body on the outer surface of said substrate body and extending along the peripheries of said perforations to the inner surface of said substrate body confronting the movable blade, said inner surface being devoid of said coating so that said substrate body is substantially completely exposed thereat, thereby forming hard cutting edges along the rims of said perforations at said inner surface.

2. A shearing foil as defined in claim 1 wherein at least said substrate body is metallic.

3. A shearing foil as defined in claim 2 wherein at least said substrate body includes nickel.

4. A shearing foil as defined in claim 1 wherein said perforations converge toward said inner surface and have rounded edges remote from said inner surface.

5. A shearing foil as defined in claim 1 wherein said coating at the periphery of said perforations forms an acute angle with said inner surface at the rims of said perforations.

6. A shearing foil as defined in claim 1 wherein said substrate body is of sufficient softness to enable the formation of concavities in said lower surface within the confines of said coating by contact with the movable blade.

References Cited
UNITED STATES PATENTS 3,064,349  11/1962  Futterer et al. ___ 30—346.51 X
3,169,317  2/1965  Futterer et al. _____ 30—346.51

WILLIAM W. DYER, Jr., *Primary Examiner.*

G. WEIDENFELD, *Assistant Examiner.*